Figure 1:
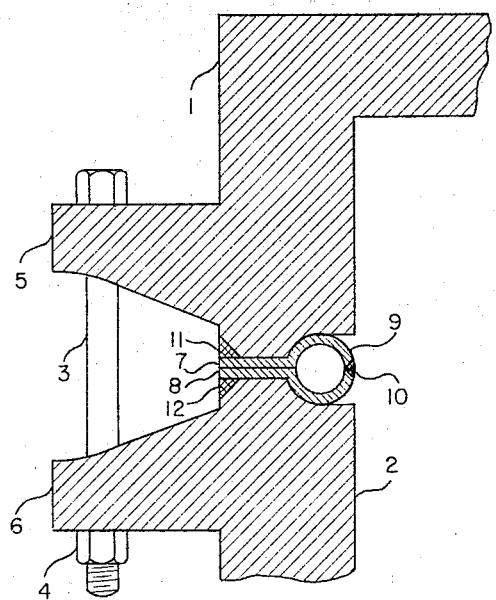

AXEL CHRISTENSEN
INVENTOR.
BY J. T. Chaboty
AGENT

United States Patent Office 3,269,585
Patented August 30, 1966

1

3,269,585
PRESSURE VESSEL CLOSURE
Axel Christensen, Stamford, Conn., assignor to Chemical Construction Corporation, New York, N.Y., a corporation of Delaware
Filed Jan. 20, 1964, Ser. No. 338,674
2 Claims. (Cl. 220—46)

The present invention relates to an improved closure for pressure vessels, such as an ammonia synthesis converter, in which a process fluid is retained at elevated pressure. An apparatus assemblage is provided which provides total closure against fluid leakage in a simplified and improved manner.

Various types of closure assemblages have been provided for the sealing of pressure vessels against fluid leakage. Perhaps the simplest type of prior art closure is the conventional flange and gasket assembly, in which tension bolts act to compress a gasket at the closure interface, thus providing sealing. This arrangement is satisfactory in some cases, however, the interface surfaces must be machined to a precise finish which is a costly operation, and in addition any damage or scratching of the surfaces or gasket during assembly of the unit may lead to leakage during operation at high pressure. In addition, where pressure variations are encountered the alternate application and relaxation of tension on the gasket leads to deformation and ultimate leakage. Similar considerations apply with respect to a simple welded or back-welded joint. In addition, a welded joint in which the weld is partially relied on for structural integrity is of questionable reliability at elevated pressure, and welded joints are subject to stress and ultimate rupture or leakage in service when displacement of the vessel members takes place due to elongation of closure bolts at high pressure.

One type of prior art closure which seeks to accommodate for displacement of the pressure vessel members in service is that of British Patent No. 937,588. In this apparatus, sealing against fluid leakage is attained by the action of serrated ribs against soft metal rings or gaskets. Continuous pressure of the ribs against the rings or gaskets is obtained by application of internal vessel pressure against a sealing member which features a pair of opposed rings provided with opposed recesses in which a flexible metal diaphragm is disposed. The internal vessel pressure is connected into the metal diaphragm so that the diaphragm forces the rings against the vessel body members. In turn, the rings are provided with integral soft metal ring sections or gaskets which act against serrated ribs extending from the vessel body members. This assemblage is open to the objection that the soft metal rings or gaskets are subject to deformation and distortion in service due to the action of the serrated ribs, particularly when removal and re-insertion of the sealing member is necessary. Thus, leakage in service due to misalignment or damaging of the softer elements during removal and replacement of the sealing member may readily take place.

In the present invention, a comparatively simple yet effective sealing apparatus is provided for pressure vessel closures. The interface between the two vessel elements is provided with opposed curved recesses in the vessel elements at their inner perimeters. A sealing ring is disposed in the interface, and consists of adjacent disc-shaped sections in the flat contact interface, which lead to a substantially toroid-shaped section disposed in the opposed recesses. The disc-shaped sections are welded to the respective vessel elements, and the toroid-shaped section is split at the interface between the disc-shaped elements. In operation, internal vessel pressure acts against the toroid-shaped section. Total sealing against leakage under deformation is achieved by the welding of the disc-shaped elements to the vessel members. Thus, when in-

2 ternal pressure is applied, the vessel members are displaced due to elongation of the closure bolts or differential expansion of vessel members. However, the sealing ring is concomitantly compressed and deformed at its toroid-shaped section without fluid leakage taking place.

The apparatus assemblage of the present invention has several noteworthy advantages. Effective sealing is achieved and maintained, regardless of displacement or lateral movement of the vessel members, due to elongation of closure bolts or differential expansion of vessel members. The closure is relatively simple to fabricate and assemble in place, since the total unit consists essentially of a single sealing ring which is merely pre-fabricated and disposed in the interface between the vessel members, followed by welding of the disc-shaped sections to the respective vessel members. Sealing of the closure joint is completely maintained regardless of alternate deformation and compression due to fluctuations in internal pressure.

It is an object of the present invention to provide an improved pressure vessel closure joint.

Another object is to provide a closure joint which attains total sealing regardless of deformation or displacement of pressure vessel members.

A further object is to provide a closure joint which is flexible in service while maintaining total sealing at elevated pressure.

An additional object is to provide a closure joint which eliminates soft gaskets or other joint members subject to deformation or distortion.

Still another object is to provide a closure joint which is comparatively simple, and readily fabricated and installed in service.

These and other objects and advantages of the present invention will become evident from the description which follows. Referring to the figures, FIGURE 1 provides an overall elevation view of the closure joint of the present invention in service, and FIGURE 2 provides a detail elevation view of a preferred embodiment of the sealing ring of the present invention as installed.

In FIGURE 1, compression of the interface between upper vessel cover 1 and vessel body 2 is attained by means of closure bolts 3 having studs 4. Bolts 3 are extended between flanges 5 and 6 and are suitably tightened in service to provide adequate compression against displacement of the vessel members when elevated pressure is maintained inside the vessel. The interface between cover 1 and body 2 is provided with a sealing ring assembly consisting of disc-shaped elements 7 and 8 which are joined to the toroid-shaped element 9. For assembly purposes element 9 is provided with a weld joint 10, while disc elements 7 and 8 are sealed against the respective vessel members 1 and 2 by weld joints 11 and 12. The welds 11 and 12 serve to provide positive sealing against fluid leakage.

In high pressure service, some displacement or even lateral movement of cover 1 relative to vessel body 2 may take place, due to deformation of vessel members. It will be evident that concomitant compensation will take place in toroid-shaped element 9, and that no stress is applied to welds 11 and 12. Thus, leakage of the joint in service is effectively prevented under all circumstances. The assembly of the sealing unit in practice is readily accomplished. Thus, the upper and lower sections are welded together as by weld joint 10. Then, the unitary sealing ring is disposed over the interface surface of vessel body 2 and cover 1 is mounted in place. Finally, weld joints 11 and 12 are applied. The completed sealing unit is then maintained essentially in position by the provision of bolts 3, which are fastened in position under tension by studs 4.

Figure 2:
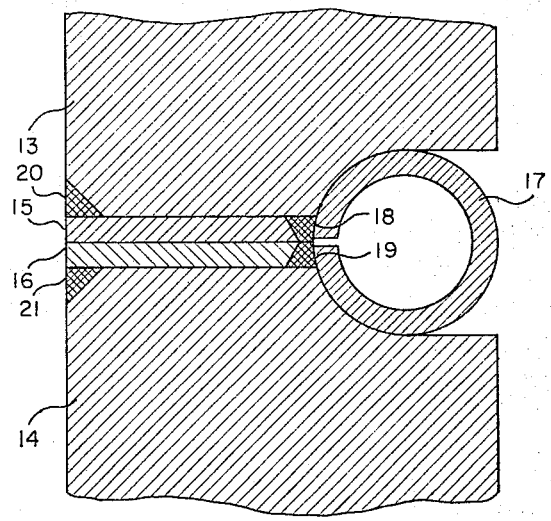

In FIGURE 2, a preferred mode of assembly of the sealing ring is illustrated. The sealing ring is disposed between upper body portion 13 and lower body portion 14 of the pressure vessel, and consists of upper disc ring 15, lower disc ring 16, and toroid-shaped inner ring member 17. The toroid-shaped ring member 17 is split at its joint with the disc rings 15 and 16, and the ends of ring 17 are joined to the respective ends of rings 15 and 16 by weld joints 18 and 19. The outer ends of rings 15 and 16 are in turn joined to body portions 13 and 14 by the respective weld joints 20 and 21. It will be evident that weld joints 18, 19, 20 and 21 must be gas-tight, in order to prevent fluid leakage through the ring from inside the vessel when high internal pressure is provided.

Numerous alternatives within the scope of the present invention will occur to those skilled in the art. Thus, the curved recesses in the vessel members are suitably curved and the toroid-shaped element conforms to this curvature. It will be preferable to provide the vessel element recesses with a rounded curvature, in order that the toroid-shaped element may be fabricated from a pipe. Other suitable retention means may be provided to secure the cover 1 to the vessel body 2, such as a keyed joint. Finally, it will be evident that the closure joint of the present invention is suitable for application to other types of high pressure service, such as high pressure piping joints.

In summary, the apparatus of the present invention provides a simple yet effective pressure vessel closure which provides total sealing against fluid leakage while accommodating for displacement or lateral stress of the pressure retention elements. Essentially all of the internal fluid pressure acting against the closure joint is transmitted by the toroid-shaped element against the rounded recesses in the vessel body and cover, and consequently no stress is placed on the fluid seal welds, even when the vessel elements are displaced by changes in internal pressure.

I claim:
1. A pressure vessel which comprises a vessel body, a cover for said body, the interface surfaces between said body and said cover being provided with opposed curved recesses at their inner perimeters, a sealing ring disposed in the interface between said body and said cover, said sealing ring consisting of outer opposed disc members extending to an inner toroid ring member disposed in said recesses, the outer edges of said disc members being welded to said vessel body and said cover, the inner edges of said disc members being welded to said toroid ring member, said toroid ring member being split at the interface between said disc members and being structurally rigid, whereby deformation of said toroid ring member due to pressure differential between internal atmospheric pressure within said toroid ring member and elevated fluid pressure within the pressure vessel is substantially prevented, and means to compress said cover against said vessel body.

2. The apparatus of claim 1, in which said curved recesses are rounded.

References Cited by the Examiner

UNITED STATES PATENTS 1,926,107   9/1933   Morehead _____ 220—46

FOREIGN PATENTS 937,588   9/1963   Great Britain.
587,117   1/1959   Italy.

LOUIS G. MANCENE, *Primary Examiner.*

GEORGE E. LOWRANCE, *Examiner.*